US006995120B2

(12) United States Patent
Crossman et al.

(10) Patent No.: US 6,995,120 B2
(45) Date of Patent: Feb. 7, 2006

(54) SCALE CONTROL COMPOSITION FOR HIGH SCALING ENVIRONMENTS

(75) Inventors: Martin Crossman, Hixson, TN (US); Stuart Peter Robert Holt, Lucerne (CH)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 11/211,269

(22) Filed: Aug. 25, 2005

(65) Prior Publication Data

US 2005/0282712 A1 Dec. 22, 2005

Related U.S. Application Data

(62) Division of application No. 09/969,740, filed on Oct. 3, 2001.

(51) Int. Cl.
  *E21B 43/28* (2006.01)
  *E23B 49/08* (2006.01)
  *C02F 5/14* (2006.01)

(52) U.S. Cl. .................. 507/227; 507/226; 507/238; 507/255; 507/927; 507/932; 507/939; 252/175; 252/389.22; 210/699; 210/701

(58) Field of Classification Search ............... 507/227
   See application file for complete search history.

(56) References Cited

U.S. PATENT DOCUMENTS

| 3,692,673 | A | * | 9/1972 | Hoke ........................ 210/728 |
| 3,709,815 | A | * | 1/1973 | Walker et al. ............... 210/701 |
| 3,709,816 | A | * | 1/1973 | Walker et al. ............... 210/701 |
| 3,898,037 | A | * | 8/1975 | Lange et al. ................. 422/16 |
| 3,928,196 | A | * | 12/1975 | Persinski et al. ............ 210/701 |
| 4,209,398 | A | * | 6/1980 | Ii et al. ...................... 210/699 |
| 4,460,627 | A | * | 7/1984 | Weaver et al. ............... 427/212 |
| 4,711,725 | A | * | 12/1987 | Amick et al. ................. 210/701 |
| 4,782,120 | A | * | 11/1988 | Rousset et al. .............. 525/326.6 |
| 4,957,666 | A | * | 9/1990 | Kawamura et al. ........... 264/4.7 |
| 5,110,358 | A | * | 5/1992 | Mongoin et al. ............. 106/462 |
| 5,145,902 | A | * | 9/1992 | Ravet et al. ................. 524/425 |
| 5,277,832 | A | * | 1/1994 | Gill et al. .................... 508/111 |
| 5,302,677 | A | * | 4/1994 | Krull et al. .................. 526/240 |
| 5,891,972 | A | * | 4/1999 | Egraz et al. ................. 526/233 |
| 5,980,776 | A | * | 11/1999 | Zakikhani et al. ........... 252/175 |
| 6,057,398 | A | * | 5/2000 | Blum ......................... 524/507 |
| 6,063,289 | A | * | 5/2000 | Failon et al. ................ 210/699 |
| 6,071,434 | A | * | 6/2000 | Davis et al. ................ 252/389.2 |
| 6,093,764 | A | * | 7/2000 | Egraz et al. ................. 524/413 |
| 6,123,869 | A | * | 9/2000 | Lawson et al. ............... 252/175 |
| 6,337,313 | B1 | * | 1/2002 | Rodrigues ................... 510/476 |
| 6,444,747 | B1 | * | 9/2002 | Chen et al. .................. 524/807 |
| 6,641,754 | B2 | * | 11/2003 | Buentello et al. ............ 252/180 |

FOREIGN PATENT DOCUMENTS

| EP | 0 459 661 B1 | * | 2/1995 |
| EP | 0 861 845 A | * | 9/1998 |
| GB | 2 082 600 | * | 3/1982 |
| WO | WO 83/02607 | * | 8/1983 |

* cited by examiner

*Primary Examiner*—Joseph D. Anthony
(74) *Attorney, Agent, or Firm*—David P. LeCroy

(57) ABSTRACT

Barium sulfate and/or calcium carbonate scale inhibitor composition composed of a water-soluble polymer having incorporated phosphate functionality, the polymer being formed from at least one ethylenically unsaturated carboxylic acid monomer, at least one ethylenically unsaturated vinyl sulfonate monomer, or a mixture thereof. The scale inhibitor composition can be used as a means of detecting inhibitor composition in downhole and topside oilfield treatments by means that are faster and more accurate than turbidometric measurement.

5 Claims, No Drawings

SCALE CONTROL COMPOSITION FOR HIGH SCALING ENVIRONMENTS

CROSS REFERENCE TO RELATED APPLICATIONS

Divisional Application of application Ser. No. 09/969,740, filed 3 Oct. 2001.

BACKGROUND OF THE INVENTION

The present invention relates to a barium sulfate scale inhibitor composition containing a water-soluble carboxylic acid or sulfonate polymer having phosphate functionality. The invention also relates to a method for reducing calcium carbonate and/or barium sulfate scale in high scaling environments, especially in subterranean oil fields. Additionally the scale inhibitor can be detected by inductively coupled plasma-atomic emission spectroscopy (ICP) or UV-vis, providing a method for measuring concentration of inhibitor in both downhole and topside treatments.

Subterranean oil recovery operations can involve the injection of an aqueous solution into the oil formation to help move the oil through the formation and to maintain the pressure in the reservoir as fluids are being removed. The injected water, either surface water (lake or river) or seawater (for operations offshore) contains soluble salts such as sulfates and carbonates. These salts may be incompatible with the ions already contained in the oil-containing reservoir (formation water). The formation water may contain high concentrations of certain ions that are encountered at much lower levels in normal surface water, such as strontium, barium, zinc and calcium. Partially soluble inorganic salts, such as barium sulfate and calcium carbonate, often precipitate from the production water as conditions affecting solubility, such as temperature and pressure, change within the producing well bores and topsides. This is especially prevalent when incompatible waters are encountered such as formation water, seawater, or produced water.

Barium sulfate and strontium sulfate form very hard, very insoluble scales that are difficult to prevent. Barium and strontium sulfates are often co-precipitated with radium sulfate, making the scale mildly radioactive and introduces handling difficulties. Unlike common calcium salts, which have inverse solubility, barium (strontium and radium) sulfate solubility is lowest at low temperature, and this is particularly problematic in processing oil where the temperature of the fluids decreases. Modern extraction techniques often mean that the temperature of the produced fluids (water, oil and gas mixtures/emulsions) are decreased (as low as 5 C) and contained in production tubing for long periods (24 hrs or longer). Calcium carbonate can be readily removed using HCl acid washing should scale occur. This can be performed topside or downhole, is cheap, and is non-invasive. Dissolution of sulfate scales is difficult (requiring high pH, long contact times, heat and circulation) and can only be performed topside. Alternatively, milling and in some cases high-pressure water washing can be used. These are expensive, invasive procedures and require process shutdown. Inhibition is the key approach to sulfate scales, especially downhole.

Barium sulfate, or other inorganic supersaturated salts, can precipitate onto the formation to form a scale, thereby clogging the formation and restricting the recovery of oil from the reservoir. The insoluble salts may also precipitate onto production tubing surfaces and associated extraction equipment that can limit productivity, limit production efficiency, and compromise safety. Certain oil-containing formation waters are known to contain high barium concentrations of 400 ppm, and higher. Since barium sulfate forms a particularly insoluble salt, the solubility of which declines rapidly with temperature, it is difficult to inhibit scale formation and to prevent plugging of the oil formation and topside processes and safety equipment.

While "scale inhibition" and "deposit control" are generic terms without mechanistic implications, there are two generally accepted mechanisms for controlling the amount of divalent metal ions fouling or depositing in the surface of the formation: 1) inhibiting precipitation of the material from the process water, or 2) dispersing the material once it has formed, to prevent it from attaching to the surfaces. The exact mechanism by which a particular scale inhibitor functions, and the interplay between these two or other mechanisms is not well understood. The compositions of the present invention may operate by either or both of these routes.

Current methods for inhibiting barium sulfate scaling involve the use of expensive organic phosphonic acids, as described in U.S. Pat. Nos. 6,063,289 and 6,123,869. Acrylic polymer scale inhibitors containing a phosphino or phosphono moiety are also used. U.S. Pat. No. 4,209,348 describes a copolymer of (meth)acrylic acid having a phosphate functionality that is useful as a combined scale and corrosion inhibitor in industrial water treatment. This chemistry provides only limited adhesion to the oil-containing formation. U.S. Pat. No. 4,711,725 describes the use of terpolymers of (meth)acrylic acid/2-acrylamido-2-methyl propane sulfonic acid/substituted acrylamides for inhibiting the precipitation of calcium phosphate.

EP 459661 A1 describes a method for silica scale inhibition using a mixture of aluminum or magnesium ions with a low molecular weight poly(meth)acrylic acid or polymaleic acid, plus either a copolymer or a terpolymer of a) (meth)acrylic acid or maleic acid with b) (meth)acrylamido methyl propane sulfonic acid, or styrene sulfonic acid, and c) another monomer which could be a vinyl ester, and the vinyl ester could contain a phosphate group.

Surprisingly it has been found that the addition of a phosphate moiety to a polyacrylate or polysulfonate scale inhibitor allows for greater adsorption to an oilfield reservoir, thus allowing for an increase in the treatment lifetime, while still retaining good scale inhibition properties. Polymeric inhibitors also have the advantage of being relatively unmetabolized, and therefore have low toxicity and bioaccumulation characteristics.

SUMMARY OF THE INVENTION

The present invention is directed to a scale inhibitor composition for barium sulfate scale and for calcium carbonate scale, comprising a water-soluble polymer having phosphate functionality, wherein said polymer is selected from the group consisting of
  (a) a polymer formed from at least one ethylenically unsaturated (di)carboxylic acid monomer,
  (b) a polymer formed from at least one ethylenically unsaturated sulfonate monomer, and
  (c) mixtures thereof.

Other embodiments of the invention are methods for inhibiting the formation of barium sulfate scale and calcium carbonate scale, comprising forming the inhibitor composition of the invention, and contacting said inhibitor composition with a surface in contact with an aqueous solution containing barium and sulfate ions.

Still another embodiment of the invention is a method for detecting the concentration of an inhibitor solution for use in subterranean oil field use comprising forming the inhibitor composition of the invention; injecting said inhibitor composition into a subterranean oil-containing formation; bringing a aqueous solution containing the inhibitor composition from the subterranean oil-containing formation to a location above the oil-containing formation, and analyzing for the phosphate moiety.

DETAILED DESCRIPTION OF THE INVENTION

The present invention is directed to a scale inhibitor for barium sulfate scale and calcium carbonate scale comprising a water-soluble polymer polymerized from at least one ethylenically unsaturated carboxylic acid monomer or sulfonate monomer, where the polymer contains phosphate functionality. Properties desirable in a barium scale inhibitor for use in oilfield applications include that the inhibitor should a) have a high salt (especially calcium) tolerance, b) adsorb onto the oil-containing formation from a 5–30 percent active solution, c) not desorb under high shear, d) be water-soluble and should desorb at a concentration above the minimum inhibitor concentration (MIC) for as long a period as possible, and e) be effective under the high-temperature and high-pressure environments encountered in subterranean oil field applications, as well as lower pressure and lower temperature environments that might be experienced in the process of separating the oil, gas and water.

The scale inhibitor of the present invention is a low molecular weight water-soluble polymer based on a (di) carboxylic acid and/or sulfonate monomers. A (di)carboxylic acid monomer, as used herein, refers to mono-carboxylic acid monomers, di-carboxylic acid monomers, and mixtures thereof. The carboxylic acid polymer is formed from one or more ethylenically unsaturated carboxylic acid monomers including, but are not limited to, acrylic acid, methacrylic acid, ethacrylic acid, α-chloro-acrylic acid, α-cyano acrylic acid, α-chloro-acrylic acid, α-cyano acrylic acid, β-methylacrylic acid (crotonic acid), α-phenyl acrylic acid, β-acryloxy propionic acid, sorbic acid, α-chloro sorbic acid, angelic acid, cinnamic acid, p-chloro cinnamic acid β-styryl acrylic acid (1-carboxy-4-phenyl butadiene-1,3), itaconic acid, maleic acid, citraconic acid, mesaconic acid, glutaconic acid, aconitic acid, fumaric acid, and tricarboxy ethylene. Preferred monomers include (meth)acrylic acid and/ or maleic acid (or anhydride) polymer. The carboxylic acid polymer may optionally include other ethylenically unsaturated monomers known in the art, provided the polymer contain 50 to 99.5 mole percent of one or more carboxylic acids and at least 0.5 mole percent of a phosphate moiety, based on total moles of monomer. Phosphate-functional carboxylic acid polymers are effective at inhibiting calcium carbonate scale as well as barium sulfate scale.

Sulfonate polymers are formed from at least one unsaturated sulfonic acid monomer, including but not limited to (meth)acrylamido methyl propane sulfonic acid, styrene sulfonic acid, vinyl sulfonic acid, 3-sulfopropyl (meth) acrylate, (meth)allyl sulfonic acids, (meth)allyloxy benzene sulfonic acids, allyloxy hydroxyalkyl sulfonic acids. Preferably the polymer includes vinyl sulfonic acid, 2-acrylamido-2-methylpropane sulfonic acid, or a mixture thereof. The sulfonate polymer contains from 50 to 99.5 mole percent of at least one sulfonic acid monomer, from 1 to 50 mole percent of at least one other ethylenically unsaturated monomer, and at least 0.5 mole percent of a containing phosphate moiety, based on the total moles of monomer.

The scale inhibitor polymer preferably is a polymer formed from at least one carboxylic acid monomer and at least one ethylenically unsaturated sulfonic acid monomer. The polymer may also contain other ethylenically unsaturated monomers known in the art. The incorporation of sulfate monomer into the polymer aids in stabilizing the polymer in environments containing high salt and high calcium concentrations. The carboxylic acid monomer is preferably present in the polymer at from 50 to 99 mole percent. The sulfonic acid monomer is preferably present in the polymer at from 0.5 to 50 mole percent, preferably 1 to 35 mole percent, and most preferably 2 to 20 mole percent, based on the total number of moles of monomer.

The phosphate functionality provides the polymeric inhibitor with good adsorption/desorption characteristics, allowing the polymer to be retained in the reservoir and providing extended treatment lifetimes. Polymers in general exhibit poor adsorption ability, yet it has been found that the addition of phosphate functionality enhances adsorption. This makes the polymeric inhibitor of the present invention useful in downhole applications. The phosphate functionality can be attached to the polymer by any means known in the art, including, but not limited to, copolymerization, a two-stage polymerization, grafting, or attachment of a phosphate surfactant. The preferred method for incorporation of phosphate functionality into the inhibitor is by a copolymerization of the carboxylic acid and/or sulfonate monomer(s) with one or more phosphate-containing monomer(s), and optionally other ethylenically unsaturated monomers. Examples of phosphate-containing monomers useful in the present invention include, but are not limited to, phosphate (meth)acrylate monomers and (meth)allyl hydroxy phosphates. A preferred monomer is ethylene glycol methacrylate phosphate. The advantage of using a phosphate-containing monomer over a phosphate ester surfactant is that it allows incorporation of a higher level of the phosphate functionality. The phosphate monomer is incorporated at from 0.5 to 50 mole percent, preferably 1 to 35 mole percent, and most preferably 2 to 20 mole percent, based on the total moles of monomer.

The phosphate functionality may also be incorporated into the polymer by means of a phosphate-containing surfactant, such as for example an oleyl ethoxylated phosphate ester. The polymer is polymerized in the presence of the phosphate surfactant, or a mixture of phosphate and other surfactants. The phosphate-containing surfactant is incorporated onto the polymeric inhibitor at a level of from 0.1 to 20 mole percent, preferably 1 to 10 mole percent, based on the total moles of monomer.

Additional ethylenically unsaturated monomers, as known in the art, may also be incorporated into the polymeric scale inhibitor. The additional monomers may be present in the polymer at from 5 to 30 mole percent based on the total number of moles of monomer.

The preferred polymeric scale inhibitor composition of the present invention is a polymer of acrylic acid/2-acrylamido-2-methyl propane sulfonic acid/ethylene glycol methacrylate phosphate.

Polymerization of the polymeric scale inhibitor can be by any means known in the art, including batch, semi-batch, staged, or continuous polymerization.

The weight average molecular weight of the polymeric scale inhibitor is from 500 to 50,000, and preferably from 2,000 to 20,000, based on a polyacrylate standard.

The phosphate-functional scale inhibitor is useful for inhibiting barium sulfate and strontium sulfate scaling in oil-field applications, and also for calcium carbonate inhibition. The inhibitor is generally blended into the downhole treating solution at a level of from 1 to 500 ppm, preferably 10 to 150 ppm, based on the total solution. In addition to the inhibitor, the process solution is generally a mixture of fresh and/or salt water to which has been added other additives such as anti-corrosion agents, biocides and others chemicals as appropriate to treat the well conditions.

The scale inhibitor is applied to the reservoir in a process called a squeeze. The squeeze is a three-stage process by which fluids are injected directly into the wellbore, reversing the flow of liquid back down into the reservoir. First a dilute solution of scale inhibitor (0.1%) with surfactant (0.1%) is applied to clean and cool the near wellbore. This step is followed by a high concentration solution of the scale inhibitor active (called the pill) at between 5 and 20%, finally followed by a low concentration solution of inhibitor which is applied to move the pill away from the near wellbore, radially outward to a distance into the near wellbore which is designed to give maximum squeeze life (based on laboratory modeling). The solutions are left in contact with the reservoir for between 6 and 24 hours ideally to allow for adsorption equilibration, after which the well is returned to production. Adhesion to the formation allows the inhibitor to remain within the near-wellbore area without being pumped up in the oil/water emulsion, returning only at concentrations in the aqueous phase below 250 ppm (and above MIC) for an extended period thus providing a longer treatment lifetime. The phosphate moiety on the polyacrylate allows for the combination of nucleation inhibition with crystal growth retardation and crystal growth modification. The addition of a sulfonic acid monomer to the polymer also allows excellent compatibility with the formation water (especially high calcium brines) and is known to give greater efficacy when encountering barium scales. Although squeeze application of the chemical is the most common method of treating downhole scale, the product could also be applied by other techniques commonly used offshore, which include gas-lift injection, downhole annulus injection, encapsulation or soluble matrix techniques, sub-sea wellhead injection via umbilical or indeed secondary topside treatments to enhance inhibitor performance as process conditions vary scaling tendency.

One further advantage of using the composition of the present invention in the inhibition of oilfield scales is that for both downhole and topside treatments, the incorporation of the phosphate functionality into the polymer backbone provides a means to improve the detectability of the inhibitor. Polymers containing phosphorus functionality can be readily detected by ICP analysis, with a residual accuracy of less than 1 ppm. For detectability purposes, the phosphate monomer is incorporated into the polymer as a "tag" at from 0.5 to 5 mole percent, and preferably from 1 to 2 mole percent. This would be an alternative to the phosphinate tag technology currently used. The inclusion of the phosphorous containing monomer allows detectability for topside inhibitors as well as for downhole types. The use of the phosphate monomer tag provides a high degree of detectability, and is more accurate and quicker than the turbidometric test currently used. Prior to application of the product, experiments are conducted in a laboratory to determine an effective minimum inhibitor concentration (MIC) which just inhibits inorganic scale formation under simulated production conditions. The ability of the operator to quickly and accurately determine the amount of scale inhibitor in the produced fluids and compare this to the MIC values generated allows him to decide when it is most suitable to retreat the reservoir or increase the topside addition rate to ensure that no damage occurs to his reservoir or equipment due to inorganic scale deposition.

The following examples are presented to further illustrate and explain the present invention and should not be taken as limiting in any regard.

EXAMPLE 1

Acetate Buffered Static Barium Sulfate Inhibition Efficiency Test

The following test was used to determine the static barium sulfate inhibition efficiency:

1. Prepare two brine solutions by dissolving the appropriate salts in distilled water.

|  | Formation water (FW) | Sea Water (SW) |
|---|---|---|
| Ion | ppm | ppm |
| Sodium | 31,275 | 10,890 |
| Calcium | 5,038 | 428 |
| Potassium | 654 | 460 |
| Magnesium | 739 | 1,368 |
| Barium | 269 | 0 |
| Strontium | 71 | 0 |
| Sulfate | 0 | 2,960 |

2. Filter the brine solutions through 0.45 μm membrane filters.
3. Dissolve the scale inhibitor (SI) in the filtered seawater (SW) to 10,000 ppm (as active SI). Filter this solution through 0.45 μm membrane filter.
4. The inhibitor solution is then diluted further into SW to give the required concentration for the particular test and each inhibitor concentration is tested in duplicate. (Note: the concentration of inhibitor in each seawater solution must be higher than that required for the test by a factor which accounts for the dilution when mixed with the formation water.)
5. Pour the appropriate volume (50 ml) of inhibitor/seawater solution into 150 ml high-density polyethylene (HDPE) bottles.
6. Pour the appropriate volume (50 ml) of formation water into 150 ml HDPE bottles so as to give 100 mls when mixed in the required ratio (1:1).
7. Add 1 ml (1 ml buffer/100 ml final brine mixture) of buffer solution to the brine containing the inhibitor, taking extreme care not to introduce impurities and cap all bottles securely. The buffer solution is an acetic acid/sodium acetate buffer solution prepared in order to give the required pH. For example in order to obtain a pH of approximately 5.5, the buffer solution is prepared by dissolving the following amounts of Analar grade reagents into 100 mls of distilled water: 13.50 g sodium acetate tri-hydrate+0.35 g acetic acid. Note: *It is important to check the effectiveness of the buffer system prior to commencement of a particular set of tests, in order to ensure that the required pH is obtained following addition of the buffer to the mixed brine system. This may often lead to small modifications of the buffer system prior to use.
8. Place the bottles containing the inhibitor solutions into a water bath and the bottles containing formation water (FW) in a oven at the appropriate test temperature for 60 minutes in order to reach thermal equilibrium.

9. Mix the two Brines together (by pouring the FW into the SW and quickly shaking.) Start a stopclock (t=0). The bottles are then replaced into the water bath at test temperature.
10. The tests are then sampled at the required time (t=2, 20 hours) by pipetting 1 ml of the supernatant into either 9 ml or 4 ml of 3000 ppm KCl and 1000 ppm PVS solution, depending on the brine system under examination.

| Test conditions | |
|---|---|
| Brine mixture: | 50:50 Forties type FW/SW |
| Temperature: | 90° C |
| pH: | 5.5 |
| Sampling Time: | 2 and 20 hours |

Sampling and Analysis—The sampling procedure is carried out as follows:

A stabilizing/dilution solution is made containing 1,000 ppm commercial polyvinyl sulfonate scale inhibitor (PVS) and 3,000 ppm potassium (as KCl) in distilled water. The solution of 1,000 ppm PVS has been shown to effectively stabilize (or quench) the sample and thus prevent further precipitation, when used as described below. The potassium is included in this solution to act as an ionization suppressant for the Atomic Absorption determination of barium.

For these tests, either 4 or 9 ml (depending on the brine system) of the KCl/PVS stabilizing solution was pipetted into a test tube at room temperature prior to sampling. One (1) ml of the particular test supernatant was then removed from the test bottles using an automatic pipette, taking care not to disturb any settled precipitate and immediately added to the 4 or 9 ml of stabilizing solution. The samples were then analyzed by Atomic Absorption Spectroscopy (AA) for barium.

Barium sulfate inhibition efficiencies are calculated using the following equation:

$$\% \ Efficiency_{(t)} = \frac{(M_B - M_I)}{M_B} \times 100 = \frac{(C_O - C_B) - (C_O - C_I)}{(C_O - C_B)} \times 100 = \frac{(C_I - C_B)}{(C_O - C_B)} \times 100$$

where:
$M_B$=Mass Barium precipitated in supersaturated blank solution.
$M_I$=Mass Barium precipitated in test solution.
$C_O$=Concentration of Barium originally in solution (i.e., t=0).
$C_I$=Concentration of Barium at sampling.
$C_B$=Concentration of Barium in the blank solution (no inhibitor) at the same conditions and sampling time as $C_I$ above.
(t)=Sampling time.

EXAMPLE 2

Measurement of Adsorption Characteristics 5 grams of crushed Clashach core material (between 38 micron and 600 micron size fraction) was mixed with 10 ml of each of each test solution containing 500 ppm active inhibitor in 60 ml HDPE bottles. (Clashach core is a highly quartzitic outcrop core material with low clay content and is used as a reference material to determine relative adsorption characteristics of scale inhibitor chemistries.) The 500 ppm active scale inhibitor solutions are allowed to contact the core material for a period of 20 hours at 95° C., after which time the test solutions are filtered through a 0.45 micron filter and the residual scale inhibitor measured and compared against that of the initial 500 ppm active inhibitor solution. The scale inhibitor concentration was measured using Inductively Coupled Plasma-Atomic Emission Spectroscopy (ICP-AES), which is accurate to part per billion levels. A range of scale inhibitor standards of known concentration (e.g., 0, 50, 250 and 1000) are prepared and the phosphorous emission levels determined. As the emission is proportional to the concentration of total phosphorous, the residual inhibitor concentration from the test solution can be calculated from the standards. Due to the different level of phosphorous in each scale inhibitor, a set of standards must be run for each different polymer. Once the residual scale inhibitor concentration has been determined, the adsorption of the polymer to the rock surface can be calculated from the following equation:

$$Adsorption \ (mg/g) = (C_1 - C_2)/M_R * V$$

where:
$C_1$=the concentration of scale inhibitor in the initial solution
$C_2$=the concentration of scale inhibitor left in solution after the test period
$M_R$=the mass of rock used in the test onto which the scale inhibitor can adsorb
V=the volume of inhibitor solution used in the test

EXAMPLE 3

Synthesis of Polymeric Scale Inhibitor

To a 2 liter glass vessel equipped with stirrer, reflux condenser and means of temperature control, 200 g of propan-2-ol and 200 g of deionized water was charged then heated to reflux. A monomer mixture of acrylic acid (200 g), 2-acrylamido-2-methyl propane sulfonic acid (141.4 g) and ethylene glycol methacrylate phosphate (34.1 g) was fed over 3 hours into the reactor. A initiator solution was fed concurrently with the monomer feed but with an overlap of 30 minutes and consisted of sodium persulfate (13.5 g), 35% hydrogen peroxide (55 g) and water (65 g). When both feeds were complete the reaction was held at reflux for 30 minutes then cooled. The propan-2-ol was removed by distillation on a rotary evaporator. The resulting polymer was neutralized with 50 g of 50% sodium hydroxide.

EXAMPLE 4

Synthesis of Polymeric Scale Inhibitor

To a 2 liter glass vessel equipped with stirrer, reflux condenser and means of temperature control; 200 g of propan-2-ol and 200 g of deionized water was charged then heated to reflux. A monomer mixture of acrylic acid (200 g), 2-acrylamido-2-methyl propane sulfonic acid (141.4 g) and Albritect 6835 (34.1 g product of Rhodia) was fed over 3 hours into the reactor. A initiator solution was fed concurrently with the monomer feed but with an overlap of 30 minutes and consisted of sodium persulfate (13.5 g), 35% hydrogen peroxide (55 g) and water (65 g). When both feeds were complete the reaction was held at reflux for 30 minutes then cooled. The propan-2-ol was removed by distillation on a rotary evaporator. The resulting polymer was neutralized with 50 g of 50% sodium hydroxide.

EXAMPLE 5

Synthesis of Polymeric Scale Inhibitor

To a 2 liter glass vessel equipped with stirrer, reflux condenser and means of temperature control; 200 g of propan-2-ol and 200 g of deionized water was charged then heated to reflux. A monomer mixture of acrylic acid (200 g), 2-acrylamido-2-methyl propane sulfonic acid (141.4 g) and Lubrhophos LB400 (30 g oleyl ethoxylate phosphate ester from Rhodia) was fed over 3 hours into the reactor. A initiator solution was fed concurrently with the monomer feed but with an overlap of 30 minutes and consisted of sodium persulfate (13.5 g), 35% hydrogen peroxide (55 g) and water (65 g). When both feeds were complete the reaction was held at reflux for 30 minutes then cooled. The propan-2-ol was removed by distillation on a rotary evaporator. The resulting polymer was neutralized with 50 g of 50% sodium hydroxide.

EXAMPLE 6

Synthesis of Polymeric Scale Inhibitor

To a 2 liter glass vessel equipped with stirrer, reflux condenser and means of temperature control; 200 g of propan-2-ol and 100 g of deionized water was charged then heated to reflux. A monomer mixture of 25% aqueous sodium vinyl sulfonate (300 g) and Albritect 6835 (15.5 g) was fed over 3 hours into the reactor. An initiator solution was fed concurrently with the monomer feed but with an overlap of 30 minutes and consisted of sodium persulfate (3.6 g), 35% hydrogen peroxide (8 g) and water (115 g). When both feeds were complete, the reaction was held at reflux for 30 minutes and then cooled. The propan-2-ol was removed by distillation on a rotary evaporator. The resulting polymer was neutralized with 10 g of 50% sodium hydroxide.

EXAMPLE 7

Static Barium Sulfate Inhibition Efficiency Test

The polymeric inhibitors were tested in the procedure of Example 1 with the following results—

| | |
|---|---|
| Example 3 = | 15 ppm active |
| Example 4 = | 15 ppm active |
| Example 5 = | 15 ppm active |
| AQUATREAT ® AR-545[1] = | 12 ppm active (comparative) |
| polyvinyl sulfonate (PVS)[2] = | 15 ppm active (comparative) |
| diethylene triamine pentamethylene phosphonic acid (DETPMP)[3] = | 10 ppm active (comparative) |

[1]Acrylic acid/2-acrylamido-2-methyl propane sulfonic acid (AA/AMPS) copolymer from National Starch and Chemical Company, Bridgewater, New Jersey having a molecular weight of about 4500.
[2]PVS (approximate molecular weight of 5000) is an example of a typical low adsorbing scale inhibitor.
[3]DETPMP is a typical adsorbing downhole scale inhibitor frequently employed offshore having a molecular weight of 564.

The scale inhibitor compositions of the invention performed as well as PVS, which is commonly used to treat such scaling situations. The performance is not as good as that of DETPMP which is commonly used to squeeze treat. However, DETPMP performance is poor when the temperature of the produced fluids decreases, whereas the polymers of the invention improve.

EXAMPLE 8

Adsorption Results

The scale inhibitors were tested at 500 ppm active in the adsorption test according to Example 2, with the following results. Results at pH 2 indicate adsorption mechanism through hydrogen bonding of the polymer with the reservoir substrate. Results at pH 6 indicate adsorption mechanism through calcium bridging of the polymer to the reservoir substrate.

| | pH 2 | pH 6 |
|---|---|---|
| DETPMP | 0.66 mg/g | 0.52 mg/g |
| AQUATREAT ® AR-545 | 0.28 mg/g | 0.23 mg/g |
| Example 4 | 0.28 mg/g | 0.16 mg/g |
| Example 3 | 0.26 mg/g | 0.07 mg/g |
| Example 5 | 0.19 mg/g | 0.22 mg/g |
| PVS | 0.10 mg/g | 0.01 mg/g |

In both pH scenarios, the inhibitors of the invention and AQUATREAT® AR-545 adsorbed much more strongly than the PVS polymer. With reference to MIC values generated, this implies that all of the compositions of the invention will have more effective squeeze lives due to more polymer being retained in the reservoir upon squeezing, with effective inhibitor dosages being similar to if not better than those for PVS.

What is claimed is:

1. A method for inhibiting the formation of barium sulfate scale in a subterranean oil-containing formation comprising:
   forming an inhibitor composition having a phosphate functional water-soluble polymer, the water-soluble polymer formed form
   at least 1 mole percent of at least one ethylenically unsaturated phosphate functional monomer,
   at least 50 mole percent of at least one ethylenically unsaturated (di)carboxylic acid monomer, and
   at least 2 mole percent of at least one ethylenically unsaturated vinyl sulfonate monomer, and
   contacting said inhibitor composition with a subterranean oil-containing formation in contact with an aqueous solution containing barium and sulfate ions.

2. A method for detecting the concentration of an inhibitor solution in subterranean oil fields comprising:
   forming an inhibitor composition having a phosphate functional water-soluble polymer, the water-soluble polymer formed from
   at least one ethylenically unsaturated phosphate functional monomer,
   at least one ethylenically unsaturated (di)carboxylic acid monomer, and
   at least one ethylenically unsaturated vinyl sulfonate monomer;
   injecting said inhibitor composition into a subterranean oil-containing formation;

bringing an aqueous solution containing the inhibitor composition from the subterranean oil-containing formation to a location above the oil-containing formation, and analyzing for the phosphate moiety.

3. The method of claim 2 wherein analysis for phosphate moiety is used to calculate concentration of inhibitor composition.

4. The method of claim 2 wherein said analyzing for phosphate moiety further comprises using either inductively coupled plasma-atomic emission spectroscopy (ICP-AES) or colorimetric complexation of free phosphate from UV degraded polymer solution.

5. The method of claim 2 wherein analysis for phosphate moiety is not by turbidometric method.

* * * * *